United States Patent [19]

Inoue et al.

[11] Patent Number: 4,751,361
[45] Date of Patent: Jun. 14, 1988

[54] AUTOMATIC TW ELECTROEROSION MACHINING SYSTEM

[75] Inventors: Kiyoshi Inoue, Tokyo; Akihiko Shimizu, Kanagawa, both of Japan

[73] Assignee: Inoue-Japax Research Incorporated, Kanagawaken, Japan

[21] Appl. No.: 852,281

[22] Filed: Apr. 15, 1986

Related U.S. Application Data

[63] Continuation-in-part of Ser. No. 650,293, Sep. 12, 1984, Pat. No. 4,626,645.

[30] Foreign Application Priority Data

Sep. 12, 1983 [JP] Japan .................. 58-166599

[51] Int. Cl.$^4$ .............................................. B23H 7/02
[52] U.S. Cl. .................. 219/69 W; 29/564; 204/224 M; 219/69 R
[58] Field of Search .............. 219/69 D, 69 E, 69 M, 219/69 W; 29/26 A, 568, 563, 564; 204/206, 224 M

[56] References Cited

U.S. PATENT DOCUMENTS

| | | | |
|---|---|---|---|
| 4,016,395 | 4/1977 | Rietveld | 219/69 W |
| 4,185,376 | 1/1980 | Johnstone | 29/568 |
| 4,473,883 | 9/1984 | Yoshida et al. | 29/568 |
| 4,480,738 | 11/1984 | Mattson | 29/563 |
| 4,512,068 | 4/1985 | Piotrowski | 29/563 |

FOREIGN PATENT DOCUMENTS

| | | | |
|---|---|---|---|
| 132409 | 1/1985 | European Pat. Off. | 29/563 |
| 2514899 | 10/1976 | Fed. Rep. of Germany | 219/69 D |
| 119327 | 9/1981 | Japan | 219/69 M |

OTHER PUBLICATIONS

"EDM Methods of Producing Small Holes" by Jameson, Presented at SME 1981 Int. Tool and Manufacturing Engineering Conf. 4/1981.

*Primary Examiner*—A. D. Pellinen
*Assistant Examiner*—Geoffrey S. Evans
*Attorney, Agent, or Firm*—Karl F. Ross; Herbert Dubno

[57] ABSTRACT

An automatic TW (traveling-wire) electroerosion machining system for machining a plurality of workpieces of different types required to acquire different contours includes a TW machine having a wire setting unit and located adjacent a predetermined path. A work dispensing unit successively dispenses the different workpieces onto the path from a store thereof located adjacent the path. This unit and a work handling and transfer unit operate under control commands from an NC unit and, in conjunction with the TW machine with the wire setting unit to carry out a plurality of work processing operations sequentially. In each operation, each individual workpiece selected from the store is transferred as it is carried on a pallet for loading onto and unloading from the TW machine. The electrode setting unit on the machine acts both to form a start hole and thread a wire-type electrode through the formed hole in the workpiece. The unloaded workpieces are transferred to an inspection stage for classification into acceptable and unacceptable products.

21 Claims, 4 Drawing Sheets

AUTOMATIC TW ELECTROEROSION MACHINING SYSTEM

CROSS REFERENCE TO RELATED APPLICATIONS

This application is a continuation-in-part of our copending application Ser. No. 650,293 filed Sept. 12, 1984 now U.S. Pat. No. 4,626,645.

FIELD OF THE INVENTION

The present invention relates to a traveling-wire (TW) electroerosion machining system or installation and, more particularly, to such a system or installation capable of automatically producing a variety of machined products with a variety of contours consecutively from a like variety of blank workpieces.

BACKGROUND OF THE INVENTION

It is well known that a TW electroerosion machine is highly suitable to impart and intricate contour with due machining accuracy to a workpiece, thus to produce, e.g. dies and molds of severe dimensional requirements. These products have their own particular specifications as demanded to meet their own particular purposes so that each must be prepared from a relative expensive blank workpieces and yet be machined individually with an extremely high degree of machining precision.

While a TW electroerosion machine, especially when designed to operate under numerical control, has proven capable of machining such a contour even of highly complex geometry with precision automatically and more efficiently than any other conventional machine, it has been found that the existing TW machine requires skillful attendance by the operator to the machine before and after the machining is carried out in the machine, and is far less than inefficient where a variety of contoured products are to be consecutively manufactured from different workpiece blanks. Such blanks require not only different machining programs but different attendant operations with respect to both work handling and machine setting. In addition, a peculiarity of the TW process has required of each separate and independent blank workpiece a start hole to allow threading by a wire electrode to initiate electroerosion. As the machining contour differs from one workpiece to another, the start hole differs in position and requires separate positioning programs to be executed for different machining operations. Thus, the existing TW machines have been far remote from a full-automatic capability in processing a plurality of workpieces of different types required to acquire different prescribed contours.

OBJECTS OF THE INVENTION

Accordingly, the present invention seeks to provide a TW electroerosion machining system or installation which is capable of consecutively TW-machining a plurality of workpiece of different types on a full automatic basis to produce the products acquiring different prescribed contours.

Another object of this invention is to provide an improved traveling wire electroerosion machine which can be used in an automated work handling system in which different types of workpieces can have different contours imparted to them on a fully automatic basis.

Still another object of this invention is to simplify the transfer of a workpiece to such a machine.

It is also an object of our invention to extend the principles of the aforementioned copending applications.

SUMMARY OF THE INVENTION

In accordance with the present invention there is provided a TW (traveling-wire) electroerosion system for machining a plurality of workpieces of different types required to acquire different contours, which system comprises: a store adjacent a predetermined path and having a plurality of separate seats for storing unmachined workpieces of different types; work dispensing means associated with the store and having a first set of operating units operable under control commands to successively dispense the different workpieces from the respective seats in a prescribed order onto the said path; a TW machine located adjacent the said path and having a second set of operating units operable under control commands for electroerosively machining each of the dispensed workpieces from the said path by means of a traveling wire-type electrode; electrode setting means associated with the said machine and having a third set of operating units operable under control commands for machining a start hole and automatically threading the wire-type electrode therethrough in the workpiece to initiate the TW-electroerosion thereof; work handling and transfer means having a fourth set of operating units operable under control commands for transferring the workpiece along the said path, and loading the workpiece from the path onto the said machine and unloading the workpiece from the machine onto the said path; and control means connected with the said first, second, third and fourth sets of operating units for operating the said work dispensing means, the said TW machine, the said electrode setting means and the said work handling and transfer means to sequentially execute the plurality of work processing operations which are equal in number to the number of the workpieces and, in each of the processing operations, for selecting a particular one of the workpieces from the corresponding seat in the said store according to the said prescribed order to dispense it on the said path, transferring the dispensed workpiece along the said path, loading it on the said machine, positioning the loaded workpiece to establish therein relative to the axis of the wire-type electrode a particular position of the starting hole from which to start the TW-electroerosion, forming the said start hole in the workpiece at the said particular position and threading the wire-type electrode through the said hole, axially advancing the threaded electrode, effecting relative displacement, while effecting stock removal, between the workpiece and the advancing electrode along a particular path programmed to generate the prescribed contour in the said particular workpiece, and unloading the machined workpiece from the said machine onto the said path.

According to a feature of the invention, a traveling wire machine is disposed adjacent the path downstream therealong from the store, the traveling wire machine including:

a tank for a machine liquid having a bottom substantially at a level of the path and a plurality of substantially upright walls rising from the bottom including a movable wall confronting the path,     means for circulating the machining liquid through the tank, means for machining a workpiece positioned in the tank with a traveling wire tool electrode in the liquid, means for displacing the movable wall out of a trajectory of a workpiece on the path opposite the tank, and a second set of operating units operable under control commands for operating each of the means of the traveling wire machine for electroerosively machining each of the workpieces dispensed onto the path by means of the tool electrode;

work transfer means including pusher means positioned along the path opposite the tank and having a further set of operating units operable under control commands for transferring workpieces from the path horizontally into the tank when the movable wall is displaced out of the trajectory, thereby loading the workpieces into the tank, and for unloading workpieces from the tank onto the path; and control means connected with the first, second and further operating units for operating the work dispensing means, the machine and the work transfer means to sequentially execute a plurality of work processing operations equal in number to the workpieces and each including transfer to the path, transfer from the path to the tank, machining in the tank to a prescribed contour, and transfer from the tank to the path in prescribed order for each workpiece.

The movable wall is mounted to swing upwardly on the tank and the second operating units include a piston-and-cylinder arrangement for swinging the movable wall upwardly and downwardly on the tank and for locking the movable wall in closed sealing relation with other walls of the tank during a machining operation with the tank.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
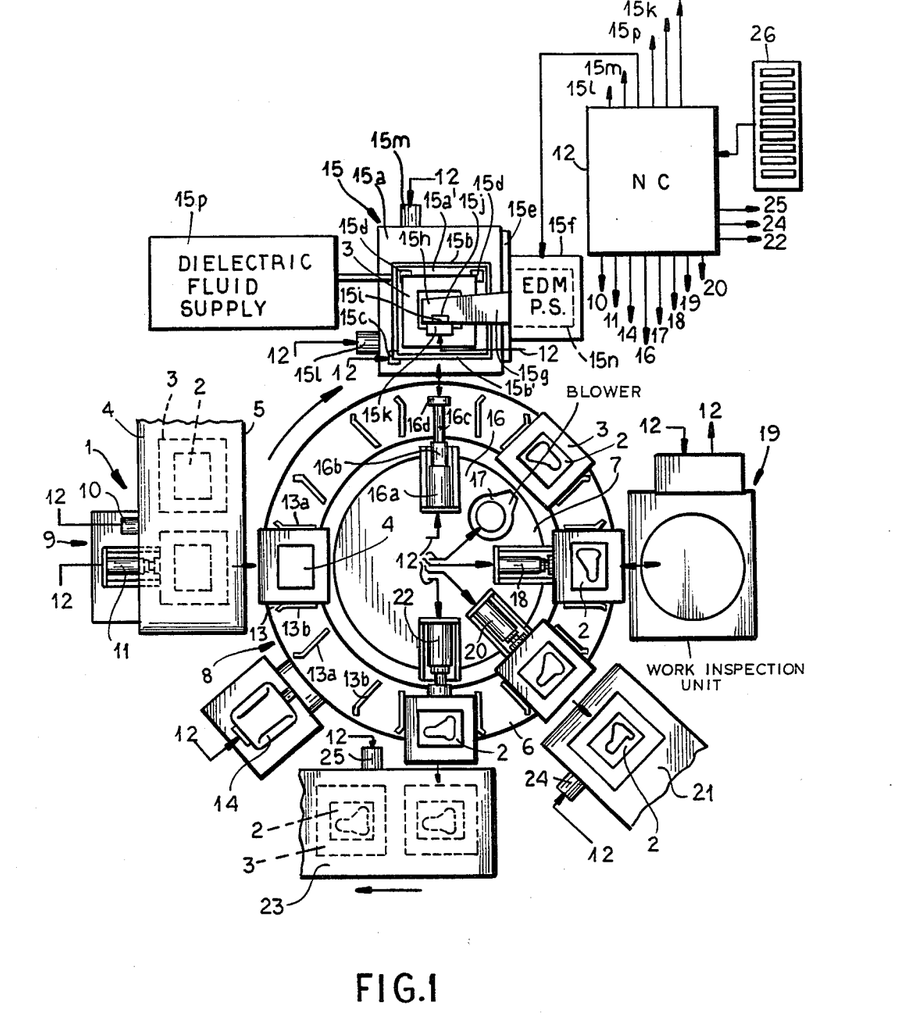
FIG. 1 is a diagrammatic top plan view of a system embodying the present invention.

The system shown includes a store 1 of a plurality of conductive blank workpieces 2 which are of different types, e.g. of different materials, thicknesses and/or areas. The workpiece 2 are here securely carried by pallets 3 which are securely but detachably positioned in seats 4 provided on a conveyor 5. The conveyor 5 is disposed adjacent a rotary conveyor or carriage 6, which is arranged as turntable around a round table 7 which is fixed in position. The carriage 6 forms a part of a work handling and transport mechanism 8 to be described.

Associated with the store 1 is a work dispensing apparatus 9 which comprises a motor 10 drivingly coupled with the conveyor 5 and a hydraulic or pneumatic actuator or feeder 11 adapted to be drivingly engaged with each pallet 3 on the conveyor 5. The motor 10 and the feeder 11 are designed to operate under control commands from a control unnit 12, e.g. a numerical controller (NC), to successively dispense the pallets 3 and thus the workpieces 2 as they are carried thereby, from the respective seats 4 on the conveyor 5 onto the conveyor 6 in a programmed order. Thus, the motor 10 operates to drive the conveyor 5 to bring a particular pallet 3 designated by the program in front of the feeder 10 which then operates to feed this pallet 3 onto the conveyor 6.

The conveyor 6 has a plurality of seats 13 each defined by a pair of guide members 13a, 13b for accepting the pallet 3 fed from the conveyor 5 to hold it firmly in position on the conveyor 6. A motor 14 is drivingly coupled with the rotary conveyor 6 and operates under control commands from the NC unit 12 to turn the conveyor 6 by a programmed angle such as to bring the pallet 3 with the workpiece 2 adjacent a TW machine 15 and in front of work loading and unloading actuator 16 of a hydraulic or pneumatic type having a base portion 16a securely supported on the round table 7.

The TW machine 15 is provided with a horizontal worktable 15a movably mounted on a base 15e to situate at a height below that of the conveyor 6. Securely mounted on the worktable 15a adjacent the conveyor 6 is a worktank 15b comprising four vertical plates arranged to form a square or rectangular box-like receptacle with the top open and the floor 15a' constituted by a portion of the worktable 15a. The frontal one 15b' of these vertical plates is arranged to be operable by being slid up by a mechanism 15c to accept the pallet 3 loaded with the workpiece 2. The mechanism 15c has a drive unit (not shown) operably connected with the NC unit 12. The worktank 15b is provided with jig members 15d vertically standing on and secured to the floor 15a' for receiving and retaining the pallet 3 from the conveyor 6 firmly in position. The jig members lie at a level above the floor 15a' and at the same height as the conveyor 6.

The work loading and unloading actuator 16 comprises a cylinder 16b supported by the base portion 16a and a piston 16c slidably received in the cylinder 16b has a disk head 16d for engagement with the pallet 3 when brought in front thereof. Under control commands from the NC unit 12, when the motor 14 has turned the conveyor 6 by the commanded angle, the mechanism 12 is operated to slide by the front plate 15b' of the worktank 15d and the actuator 16 is operated to push the pallet 3 and slide it off the conveyor 6 into the opened worktank 15b, thus loading the workpiece 2 loaded in the pallet 3 at the programmed position on the worktable 15a of the TW workpiece 15. Subsequently, again under commands from the NC unit 12, the actuator 16 is operated to retract the piston 16b to its original position in the cylinder 16c and the mechanism 15c operated to slide the front door 15b' down to close the worktank 15b.

The TW machine 15 according to a standard design has a column 15f standing upright on the base 15e and an arm 15g horizontally extending from the column 15f. The arm 15g carries at its end portion a head member 15h which overlies the workpiece 2. Typically, a further arm (not seen) is provided which extends horizontally from the column 15f to pass into the worktank 15b and to lie below and parallel to the arm 15g above the floor 15a'. A wire-type electrode 15i dispensed from a supply reel (not shown) is shown as passing through a guide 15j arranged in the head member 15h so that it may extend into and through the workpiece 2 and then through a guide (not seen) arranged in the lower arm for takeup onto a takeup device (not shown) on the machine 15 in a TW electroerosion machining operation. In the machining operation, a wire drive unit (not shown) is driven to advance the electrode 15i from the supply reel to axially move along a straight-line path established between the guides, thus linearly traveling through the workpiece 2. The operation of the wire drive unit is initiated and terminated in response to control commands from the NC unit 12.

Prior to initiation of the TW machining operation, the electrode 15i need be threaded through the workpiece 2 so that a programmed TW electroerosion along a prescribed path may properly begin at a prescribed start position interior of the workpiece 2. To this end, while it has been the conventional common practice for the operator to start with each prepared blank workpiece having a hole preformed at such a position, to manually load the workpiece on the TW machine and to manually thread the electrode or to have it automatically threaded through the preformed start hole, in the illustrated system according to the invention, not only is each workpiece 2 automatically loaded from the store 1 properly onto the TW machine 15 but the machine 15 eliminates the need for such a preformed start hole. Thus, in the system shown, an electrode setting unit 15k is provided for both forming a start hole and threading the electrode 15i through this hole, in the workpiece 2 on the machine 15. The setting unit 15k, shown as mounted on the head member 15h, may be of the type basically shown and described in U.S. Pat. No. 4,379,959 to Kiyoshi Inoue.

The electrode setting unit 15k shown is designed to operate in response to control commands from the NC unit 12 and to operate in conjunction with the worktable 15a which is adapted for displacement in an X-Y plane by an X-axis motor 15l and a Y-axis 15m drivingly coupled with the worktable 15a. The motors 15l and 15m are driven by control commands from the NC unit 12 to displace the worktable 15a so that the prescribed start position in the workpiece 2 comes coincident with the straight-line path for the wire-type electrode 15i and directly below the free end of a forming electrode which may be the wire-type electrode itself or a separate slender electrode. Under control commands from the NC unit 12, electroerosive machining current is delivered from a machining power supply 15n (shown as accommodated inside the column 15f), a machining fluid (e.g. deionized water) is supplied from a supply unit 15p into a machining gap formed between the forming electrode and the workpiece 2 while the forming electrode is axially advanced to electroerosively form the hole at the prescribed start position in the workpiece 2. Advantageously, the forming electrode is constituted by or carries, the free end portion of the wire-type electrode 15i so that its threading through the hole can be carried out simultaneously with the formation of the hole in the workpiece 2 as described in the aforementioned patent. Then, the free end portion of the wire-type electrode is taken up onto the wire takeup device, thus completing the required threading operation.

The electrode setting operation described is followed by the TW machining operation again under control commands of the NC unit 12. The NC unit 12 acts on the power supply 15n to reset the machining energy, on the fluid supply 15p to readjust the pressure and flow rate of the machining fluid and on the machining feed drive 15l, 15m so that the workpiece 2 moves relative to the traveling wire-type electrode along a prescribed path such as to generate the required contour therein.

When the programmed TW operation is over, the fluid supply unit 15p acts under control commands from the NC unit 12 to drain the machining fluid in the worktank 15b. Under control commands from the NC unit 12, the wire setting unit 15k operates to break the wire-type electrode 15i to allow the broken half thereof extending onto the takeup unit to continue to be advanced by the wire drive unit for takeup on the takeup unit. Then, the mechanism 15c operates to open the worktank 15b as described and the work actuator 16 operates to project the piston 16c and to bring the disk head 16d into engagement with the pallet 3 in the worktank 15b. The disk head 16d is here designed to serve as the active member of an electromagnet contained therein. The electromagnet is energized to cause the pallet 3 to be magnetically attracted to the head disk 16d. The piston 16c is retracted into the cylinder 16c, thus carrying the pallet 3 loaded with the machined workpiece 2 onto the conveyor 6.

With the pallet 3 fixed in position between the guide members 13a and 13b on the conveyor 6, the motor 14 is operated under control commands of the NC unit 12 to turn the conveyor by a programmed angle such that the pallet 3 is brought in front of a blower 17 mounted on the round table 7. The blower 17 is operated by control commands from the NC unit to apply a blast of air to the workpiece 2 to remove the fluid residue which remains on the surfaces thereof.

Under further control commands from the NC unit 12 applied to the motor 14, the pallet 3 with the dried workpiece 2 is then brought in front of an actuator 18 on the round table 7 and adjacent a work inspection unit 19. The actuator 18 is basically of the same design as the actuators 16 and 11 and is operated under control commands from the NC unit 12 to slide the pallet 3 off the conveyor 6 onto the inspecting unit 19. The latter may be of weighing type. Thus, the unit 19 measures the weight of the machined workpiece 2 and determine if it has a predetermined weight indicating that it has a programmed contour generated therein. Depending on the determination, the unit 19 transmits to the NC unit 12 one of an OK signal representing acceptability of the machined workpiece and a NG signal representing unacceptability of the machined workpiece. The transmitted signal is memorized in the NC unit 12. After the inspection of the unit 19 is made, the actuator 18 again operates under control commands of the NC unit 12 to return the pallet 3 onto the conveyor 6. The motor 14 is operated under control commands of the NC unit 12 to cause the conveyor 6 to turn by one of the two programmed angles depending on which one of the OK and NG signal has been memorized in the NC unit 12. If the OK signal has been memorized, the conveyor 6 is moved to bring the pallet 3 in front of first further actuator 20 on the round table 7 and adjacent a second further conveyor 23. The actuators 20 and 22 are basically of the same design as the actuators 11, 16 and 18 and operate under corresponding control commands from the NC unit to deliver the pallet 3 onto the conveyors 21 and 23, respectively. The conveyors 21 and 23 have their respective drive motors 24 and 25 which are designed to be driven in conjunction with the operations of the actuators 20 and 22 in response to the corresponding control commands from the NC unit 12. The NC unit 12 has associated therewith a data storage and selection unit 26 which has a storage of programmed numerical data which are transferred to the NC unit 12 for processing thereby to produce the control commands described.

Figure 2:
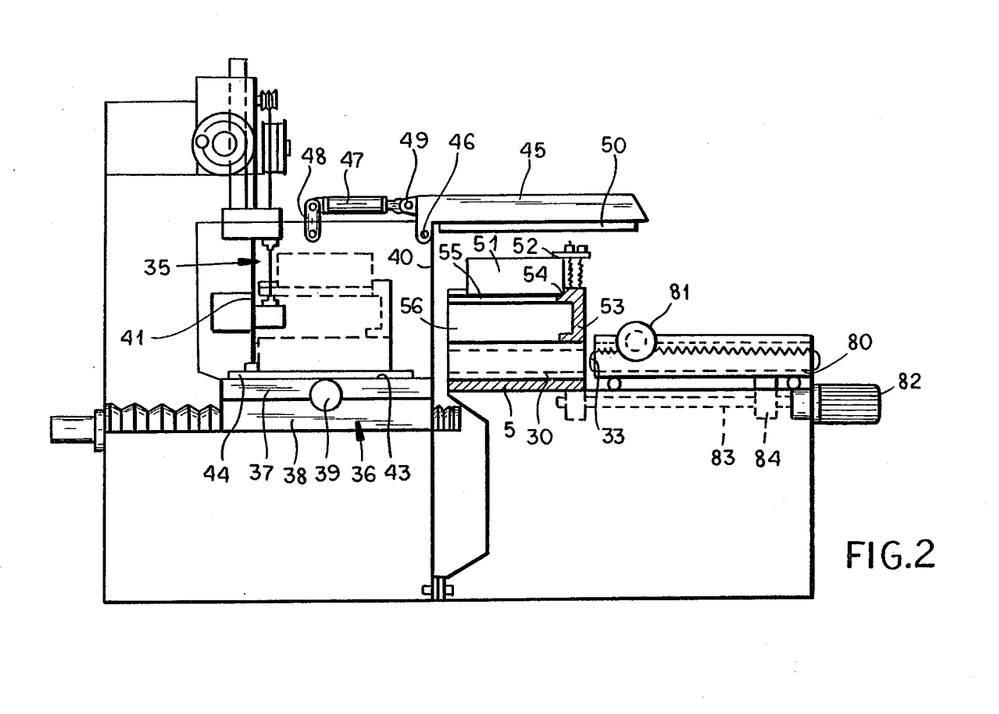
FIG. 2 is a side elevational view with the conveyor carrying the workpieces along the transport path being seen in section, illustrating the invention.
Figure 3:
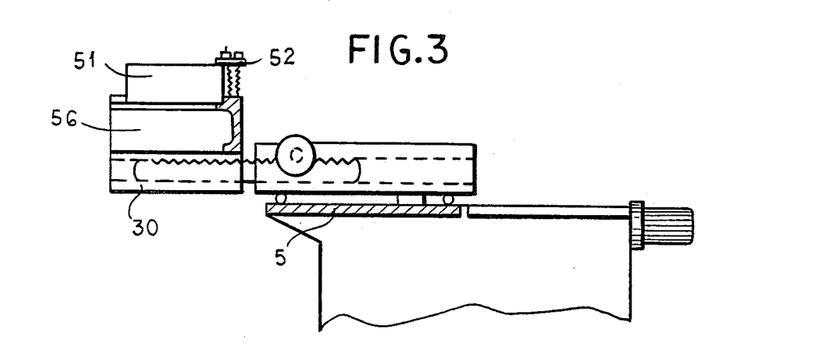
FIG. 3 is a view representing a portion of FIG. 2 but illustrating the parts thereof in another position.
Figure 4:
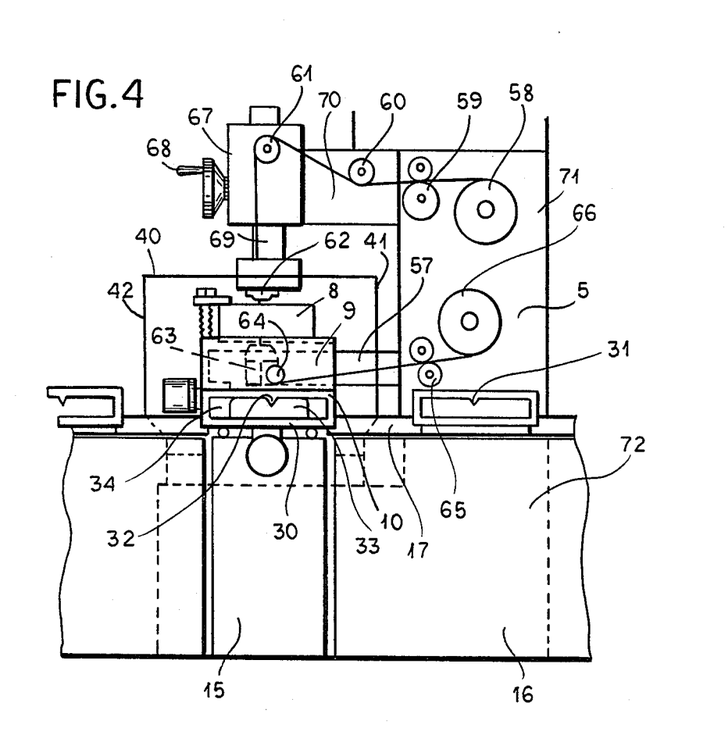
FIG. 4 is an end view of the machine shown in FIG. 2.

As can be seen from FIGS. 2 through 4, the turntable or conveyor 5 carries pallets 30 which are hollow and are provided with centering ridges 31 engageable in positioning grooves 32 of a ram 33 which can be substituted for the assembly 16 previously described. The member 33 can thus engage in the space 34 within the pallet 30 to shift this pallet into a work tank 35 mounted on an X-Y table 36 having table portions 37 and 38 movable in two mutually perpendicular directions by respective numerically controlled operating units one of which can be seen at 39.

The tank 35 has side walls 40, 41 and 42 which are fixed, as well as a bottom 43 adaped to receive the plate 30 and provided with a guideway 44 serving to properly position the pallet in the traveling wire electroerosion machine.

In addition, the tank 35 has a movable wall 45 which is hinged at its upper end at 46 to the remainder of the tank so that this movable wall can be swung upwardly into the position shown in FIG. 2 by a piston-and-cylinder unit 47 constituting one of the machine operating units controlled by the numerical controller NC, the unit 47 is pivotally connected at 48 to the tank and at 49 to the movable wall 45.

When the movable wall is swung downwardly, it has sealing edges 50 which seal the lateral opening formed in the tank when the wall is in its upwardly swung position to permit dielectric fluid supply 15p to fill the tank under control of the numerical controller NC.

Furthermore, the workpiece 51 is clamped at 52 to a lower clamping member 53 forming part of the pallet or mounted thereon, the clamping member 53 having an upper surface 54 against which the workpiece is clamped and provided with an opening 55 through which the traveling wire can pass in machining the predetermined contour in the particular workpiece.

The upper surface is located above a horizontally open compartment 56 into which the lower guide arm 57 (FIG. 4) of the machine can reach.

The traveling wire tool electrode, after the starting hole has been machined in the workpiece and the traveling wire has been threaded through the starting hole, is delivered by spool 58 to the capstan drive 59 and passes under a deflecting roller 60 including a further deflecting roller 61 to the upper guide 62 which can be provided with a nozzle for supplying he machining fluid, e.g. a dielectric for EDM operation, in a generally axial direction.

The wire, after passing through the workpiece, enters the lower electrode guide 63 which can have an upwardly directed machining liquid nozzle and then passes around the guide roller 64 to the capstan rollers to be wound up on the take-up spool 66. Each capstan roller 59, 65 is provided with a pinch roller pressing the tool electrode against the capstan. The capstan rollers are driven at appropriate speeds to maintain the tool electrode under tension.

The upper guide 62 is carried on the machine head 67 which is provided with a handwheel 68 controlling the position of a column 69 carrying the guide 62. The head 67 is mounted on an arm 70 overhanging the tank. The arm 70 extends from the machine upright 71 which is carried by the base 72.

The transfer member 33 is mounted on a slide 80 and is formed with a rack engaged by a pinion driven by a motor 81 forming one of the operating units of the work transfer means adapted to shift the pallet and a workpiece thereof into the tank when the movable wall is in its upwardly swung position as seen in FIG. 2. The slide 80 is, in turn, displaced by a motor 82 forming another operating unit of the work transfer means and driving a threaded spindle 83 engaged by a nut 84 attached to the slide 80. The operators 81 and 82, of course, are controlled by the numerical controller.

The machine shown in FIGS. 2 through 4 operates in the system of FIG. 1 in the manner there described, with the additional effect that the workpiece on the respective pallet is transferred horizontally into the tank while the movable wall is in its upwardly swung position. The slide is then withdrawn and the movable wall closed before introdution of the machining fluid commences and the machining steps described, namely, formation of the starting hole, insertion of the tool electrode and machining commences.

The machining liquid is drained by the dielectric fluid unit 15p, the movable wall 45 swung to its open position and the plate and workpiece withdrawn onto the conveyor 5 when machining is completed for repetition of the cycle with a new workpiece, all as has been described in connection with FIG. 1.

Figure 5:
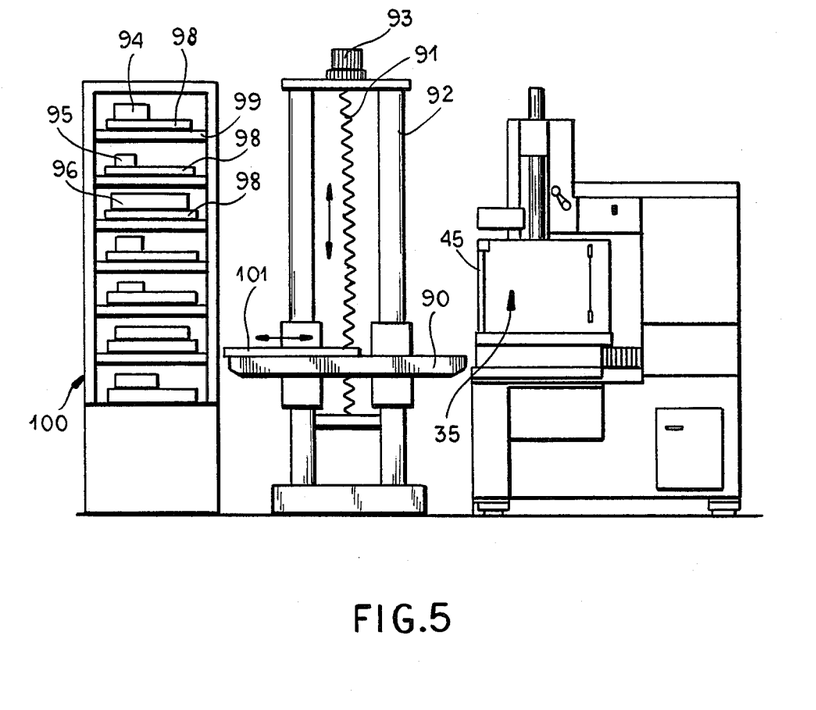
FIG. 5 is a diagrammatic side elevation of another machine in accordance with the invention.

FIG. 5 shows a machine which can be understood to be the same as the machine of FIGS. 2 through 4 in which the movable wall 45 can be swung upwardly and downwardly as described.

In FIG. 5, however, the machine is swung to be juxtaposed with a table 90 which is vertically displaceable by a threaded spindle 91 on an upright frame 92 by a motor 93 forming an operator under numerical control.

A similar frame unit can transfer respective workpieces 94, 95, 96, etc. on respective pallets 98 onto respective tiers 99 of a storage rack 100, functioning as an intermediate storage adjustment at turntable or conveyor 5. From this store, under numerical control, the workpiece to be processed is selected by the transfer slider 101 and shifted into the tank 35 when the movable wall 45 is opened.

The machine workpieces on the respective pallets can be transferred back to the rack 100 and then transferred to the conveyor in proper sequence for further processing as has been described.

I claim:

1. A traveling-wire electroerosion system for machining a plurality of workpiece of different types required to acquire different contours, said system, comprising:
   a store having a plurality of seats for storing unmachined workpieces of different types;
   means for displacing workpieces along a predetermined path adjacent said store;
   work dispensing means associated with said store and having a first set of operating units operable under control commands to successively dispense said unmachined workpieces from the respective seats onto said path in a prescribed order, whereby said workpieces are then displaced along said path;
   a traveling wire machine disposed adjacent said path downstream therealong from said store and having a machining zone, said traveling wire machine including:
   a tank for accommodating said machining zone flushed with a machining liquid having a bottom, and a plurality of substantially upright walls rising from said bottom including a movable wall confronting said path, means for circulating said machining liquid through said tank, means for machining a workpiece positioned in said tank with a traveling wire tool electrode flushed with said liquid in said machining zone, means for displacing said movable wall out of a trajectory of a workpiece on said path opposite said tank, and a second set of operating units operable under control commands for operating each of said means of said traveling wire machine for electroerosively machining each of the workpieces dispensed onto said path by means of said tool electrode;

work transfer means including pusher means positioned along said path opposite said tank and having a further set of operating units operable under control commands for transferring workpieces from said path horizontally into said tank when said movable wall is displaced out of said trajectory, thereby loading said workpieces into said tank, and for unloading workpieces from said tank onto said path; and control means connected with said first, second and further operating units for operating said work dispensing means, said machine and said work transfer means to sequentially execute a plurality of work processing operations equal in number to said workpieces and each including transfer to said path, transfer from said path to said tank, machining in said tank to a prescribed contour, and transfer from said tank to said path in prescribed order for each workpiece.

2. The traveling-wire electroerosion system defined in claim 1, further comprising:

electrode setting means connected with said machine and having a third set of operating units operable under control commands for machining a start hole in each workpiece and automatically threading said tool electrode through the start hole machined in each workpiece to initiate traveling-wire erosion thereof, said control means being connected with said third set of operating units to form the start hole in a respective workpiece after it has been positioned in said tank and to axially advance said tool electrode through the thus-formed start hole before commencement of the machining of the predetermined contour in the respective workpiece.

3. The traveling-wire electroerosion system defined in claim 1 or claim 2, further comprising identical pallets carrying each of said workpieces, said workpieces being clamped to the respective pallets and being movable thereon along said path and into said tank.

4. The traveling-wire electroerosion system defined in claim 1 or claim 2 wherein said movable wall is mounted to swing upwardly on said tank and said second operating units include a piston-and-cylinder arrangement for swinging said movable wall upwardly and downwardly on said tank and for locking said movable wall in closed sealing relation with other walls of said tank during a machining operation within said tank.

5. The traveling-wire electroerosion system defined in claim 3, further comprising a work inspection station along said path downstream of said machine for classification of said workpieces after the machining thereof into acceptable and unacceptable products.

6. The traveling-wire electroerosion system defined in claim 3 wherein said path is defined by a turntable.

7. The traveling-wire electroerosion system defined in claim 3 wherein said pallets are open beneath respective supporting surfaces against which said workpieces are clamped, said machine having an electrode-guide arm fitting into said pallets below the respective workpieces as said workpieces are transferred to said tank.

8. The traveling-wire electroerosion system defined in claim 1 wherein said bottom of said tank is located substantially at the level of said path.

9. The traveling-wire electroerosion system defined in claim 8, further comprising electrode setting means connected with said machine and having a third set of operating units operable under control commands for machining a start hole in each workpiece and automatically threading said tool electrode through the start hole machined in each workpiece to initiate traveling-wire erosion thereof, said control means being connected with said third set of operating units to form the start hole in a respective workpiece after it has been positioned in said tank and to axially advance said tool electrode through the thus-formed start hole before commencement of the machining of the predetermined contour in the respective workpiece.

10. The traveling-wire electroerosion system defined in claim 8 or claim 9, further comprising identical pallets carrying each of said workpieces, said workpieces each being clamped to the respective pallets and being movable thereon along said path and into said tank.

11. The traveling-wire electroerosion system defined in claim 8 or claim 9 wherein said movable wall is mounted to swing upwardly of said tank and said second operating units include a piston-and-cylinder arrangement for swinging said movable wall upwardly and downwardly on said tank and for locking said movable wall in closed sealing relation with other walls of said tank during a machining operating within said tank.

12. The traveling-wire electroerosion system defined in claim 11, further comprising a work inspection station along said path downstream of said machine for classification of said workpiece after the machining thereof into acceptable and unacceptable products.

13. The traveling-wire electroerosion system defined in claim 11 wherein said path is defined by a turntable.

14. The traveling-wire electroerosion system defined in claim 11 wherein said pallets are open beneath respective supporting surfaces against which said workpieces are clamped, said machine having an electrode-guide arm fitting into said pallets below the respective workpieces as said workpieces are transferred to said tank.

15. A traveling-wire electroerosion machine, comprising:

a support;

an x/y table on said support displaceable under control commands in two mutually perpendicular horizontal directions for machining a predetermined contour in a workpiece displaced with said table;

a tank on said table adapted to receive said workpiece, said tank having a bottom and a plurality of substantially upright walls rising from said bottom including a movable wall;

means for circulating said machining liquid through said tank;

means for machining a workpiece positioned in said tank with a traveling wire tool electrode in the presence of said liquid; and means for displacing said movable wall out of a path of a workpiece to be introduced into said tank horizontally and for subsequently sealing said movable wall on said tank.

16. The traveling-wire electroerosion machine defined in claim 15 wherein said movable wall is mounted to swing upwardly on said tank and said second operating units include a piston-and-cylinder arrangement for swinging said movable wall upwardly and downwardly on said tank and for locking said movable wall in closed sealing relation with other walls of said tank during a machining operation within said tank.

17. The traveling-wire electroerosion machine defined in claim 15 or claim 16, further comprising means disposed opposite said movable wall for transferring workpieces on respective pallets into said tank when said movable wall is swung upwardly.

18. The traveling-wire electroerosion machine defined in claim 17 wherein said means for transferring workpieces includes a member engageable in said pallets and horizontally displaceable to carry said pallets into and out of said tank.

19. The traveling-wire electroerosion machine defined in claim 18 wherein said horizontally displaceable member is juxtaposed with said tank across an endless path carrying pallets with workpieces mounted thereon.

20. The traveling-wire electroerosion machine defined in claim 18 wherein said horizontally displaceable member is disposed between said tank and a store provided with a multiplicity of workpieces on respective pallets.

21. The traveling-wire electroerosion machine defined in claim 19 said store is a magazine in which said pallets with respective workpieces thereon are disposed in vertically spaced tiers.

* * * * *